United States Patent [19]

Tremblay

[11] Patent Number: 4,630,908

[45] Date of Patent: Dec. 23, 1986

[54] AUDIO-VISUAL TUNNEL WITH ENDLESS CONVEYOR

[76] Inventor: Daniel Tremblay, 1429 Dupuis Street, Macouche, Canada, J7K 2V2

[21] Appl. No.: 735,986

[22] Filed: May 20, 1985

[51] Int. Cl.[4] .................................... G03B 21/10

[52] U.S. Cl. ............................ 353/94; 353/119; 353/74

[58] Field of Search .................. 353/94, 48, 119, 122, 353/74, 76, 77; 52/31, 6–8, 143; 272/8 P, 10, 16, 17, 18; 350/117; 352/69, 72

[56] References Cited

U.S. PATENT DOCUMENTS 2,877,508 3/1959 Ewart .

3,192,827 7/1965 Nagy .................................. 353/30

3,370,505 2/1968 Bryan ................................. 353/94

3,685,220 8/1972 Morrison ........................ 52/143 X 3,765,133 10/1973 Smothers .

*Primary Examiner*—Harry N. Haroian

[57] ABSTRACT

The invention pertains to a large tunnel enclosure including a main cylindrical corridor and a conveyor-belt-driven bottom floor. The main corridor comprises an inner wall being almost totally constituted by a plurality of adjacent image-producing screens, of translucent nature. The main corridor may be closed at each end thereof by extendable doors. The doors and the walls of the corridor comprise therewithin cameras which project images onto the inner side of the screens. The corridor is of modular construction, such that it may be dismantled in sub-units for facilitating transportation thereof.

13 Claims, 11 Drawing Figures

Fig. 2
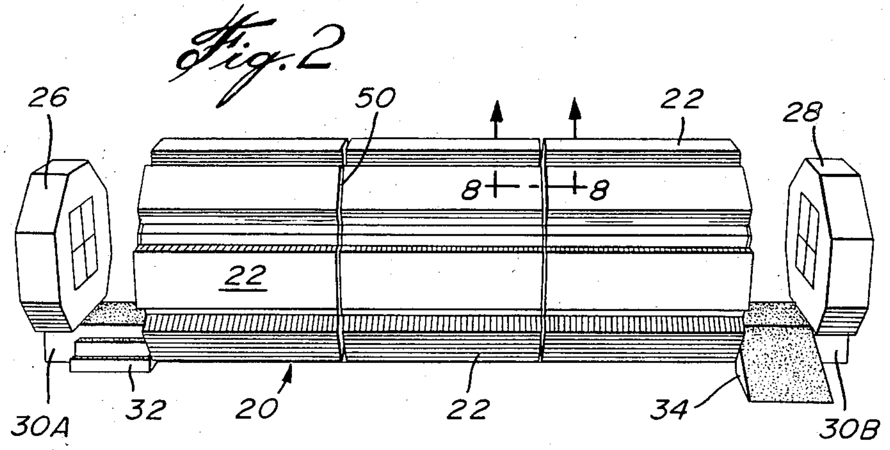
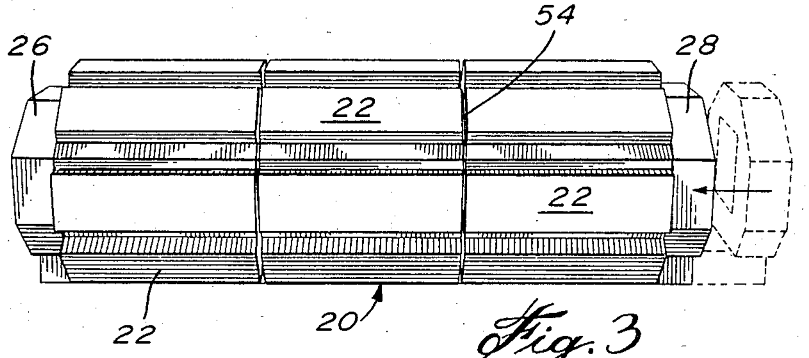
Fig. 3
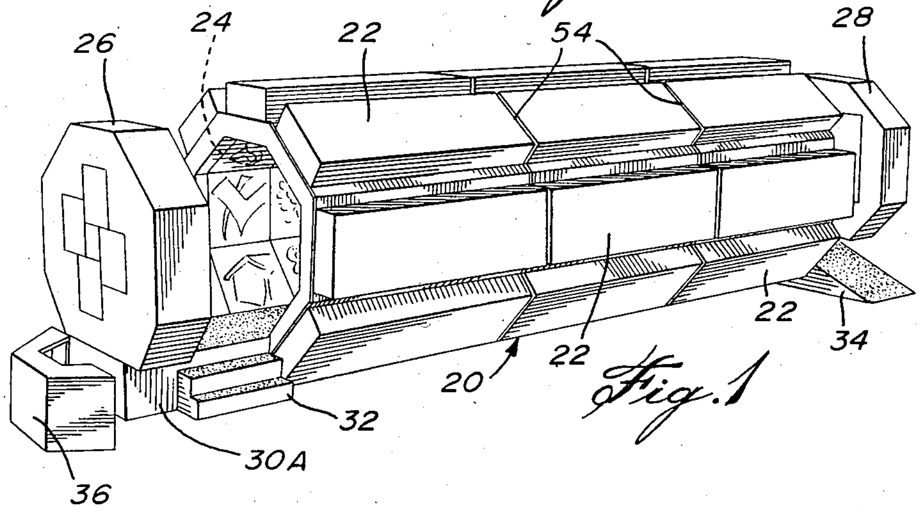
Fig. 1

Fig. 6
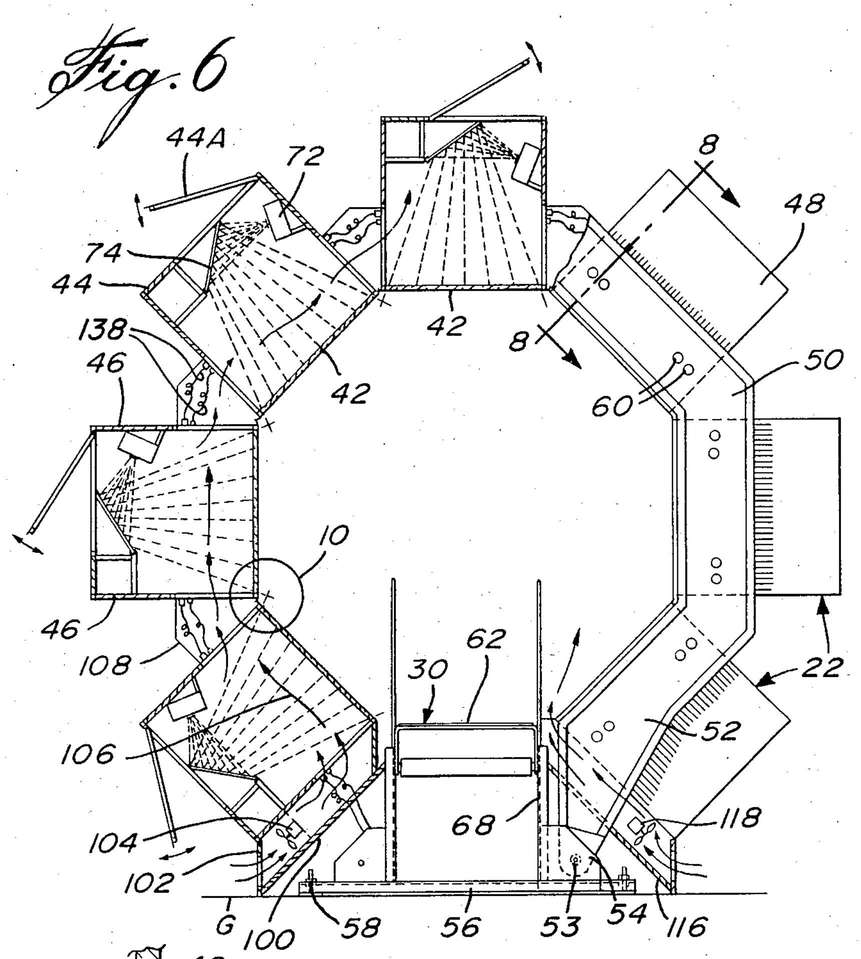
Fig. 10
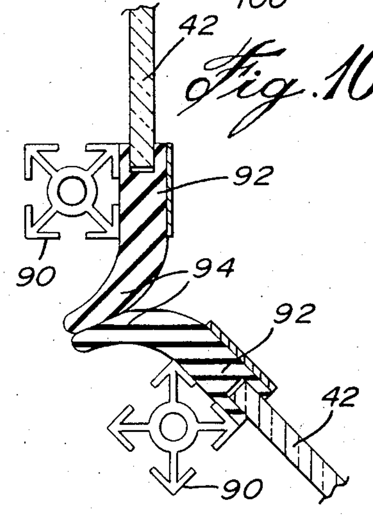
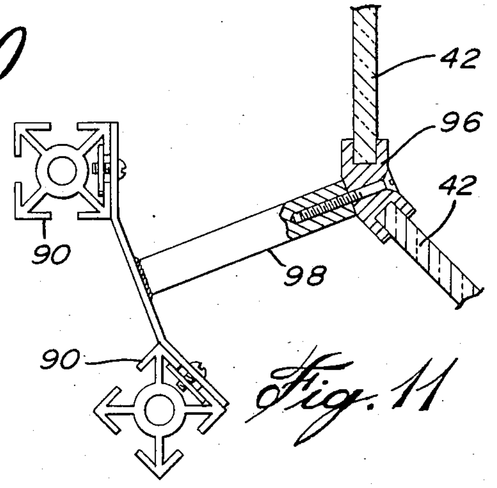
Fig. 11

AUDIO-VISUAL TUNNEL WITH ENDLESS CONVEYOR

FIELD OF THE INVENTION

This invention relates to entertainment facilities and, more specifically, to a tunnel characterized by an endless conveyor bottom floor, a modular construction, a plurality of cameras and movie projection screens, and sound-reproducing systems for the better enjoyment of visitors.

BACKGROUND OF THE INVENTION

There are disclosed in the prior art portable structures for engagement therewithin by a number of persons.

In the U.S. patent to Ewart, issued Mar. 17, 1959 and having U.S. Pat. No. 2,877,508, a portable building is shown, composed of interlocked panels 12 and 20–24. The panels are locked one to the others by resilient engagement of a tongue 31 along one edge of a panel into a groove member 35 when the structure is assembled providing a downwardly directed lapped joint. Lifting eyes 13*a*–16*a* are specifically provided, wherein the building would be suspended from an helicopter and transported in the air.

There are no specific features inside the building for entertainment or the like audio-visual representations.

In Smothers—U.S. Pat. No. 3,765,133, issued Oct. 16, 1973, the portable structure is a movie theatre. A movie projector 38 is provided for entertaining youngsters sitting on fixed benches 26. The theatre cannot be dismantled.

Improvements in such above-noted structures would be welcomed, especially dismantling structures having entertainment features incorporated therein.

OBJECTS OF THE INVENTION

The essential object of the invention is to provide a tunnel structure capable of accommodating a number of persons in total audio-visual environment.

An object of the invention is to provide a tunnel of the above type, which is of modular construction for ease of transportation and with audio-visual entertainment means embedded within the wall thereof.

A further object of the invention is to provide the above-noted tunnel structure with a conveyor belt bottom floor, for maximum visitor throughput.

Another object of the invertion is to provide the above-noted structure with air inlets and air outlets for comfort and safety of visitors.

Other features will become apparent in the detailed description of the drawings.

SUMMARY OF THE INVENTION

There is accordingly disclosed a tunnel, of generally circular cross-section, and including a main corridor and a conveyor-belt-driven bottom floor. The corridor inner wall comprises a plurality of translucent screens associated with means for providing images to persons within the corridor.

The enclosure may comprise two doors to slidingly close each end thereof. The doors may also comprise translucent screens and with image-producing means, the screens inwardly extendable from the doors through telescopic arms.

The enclosure is made of a modular construction, including a series of frame members and a number of boxes which may be dismantled for facilitating transportation thereof. Each box has an inner side constituting the screen. Within each box, there is the image-projecting equipment.

Air outlets are provided in the boxes, for evacuation of heated air from therewithin, and in the boxes and the doors for the exit of air from the closed corridor. Air inlets are provided adjacent the floor for allowing fresh air therein when the doors are closed.

The corridor walls may also comprise sound-reproducing systems, such as of the stereophonic type.

BRIEF DESCRIPTION OF THE DRAWINGS

FIGS. 1 and 2 are perspective views of the tunnel of the invention, with both end entrances being opened;

FIG. 3 is a perspective view of the tunnel of the invention, with the front end entrance being closed, and the rear end entrance being shown as opened in dotted lines and closed in ful lines;

FIG. 6 is a vertical section of the tunnel, also showing in cross-section the projection boxes on one side thereof;

FIG. 10 is an enlarged vertical sectional view of one embodiment of the projection boxes joining means, taken within circle 10 of FIG. 6 and along line 10—10 of FIG. 5; and FIG. 11 is another embodiment of the joining means of FIG. 10.

DETAILED DESCRIPTION OF THE DRAWINGS

Figure 4:
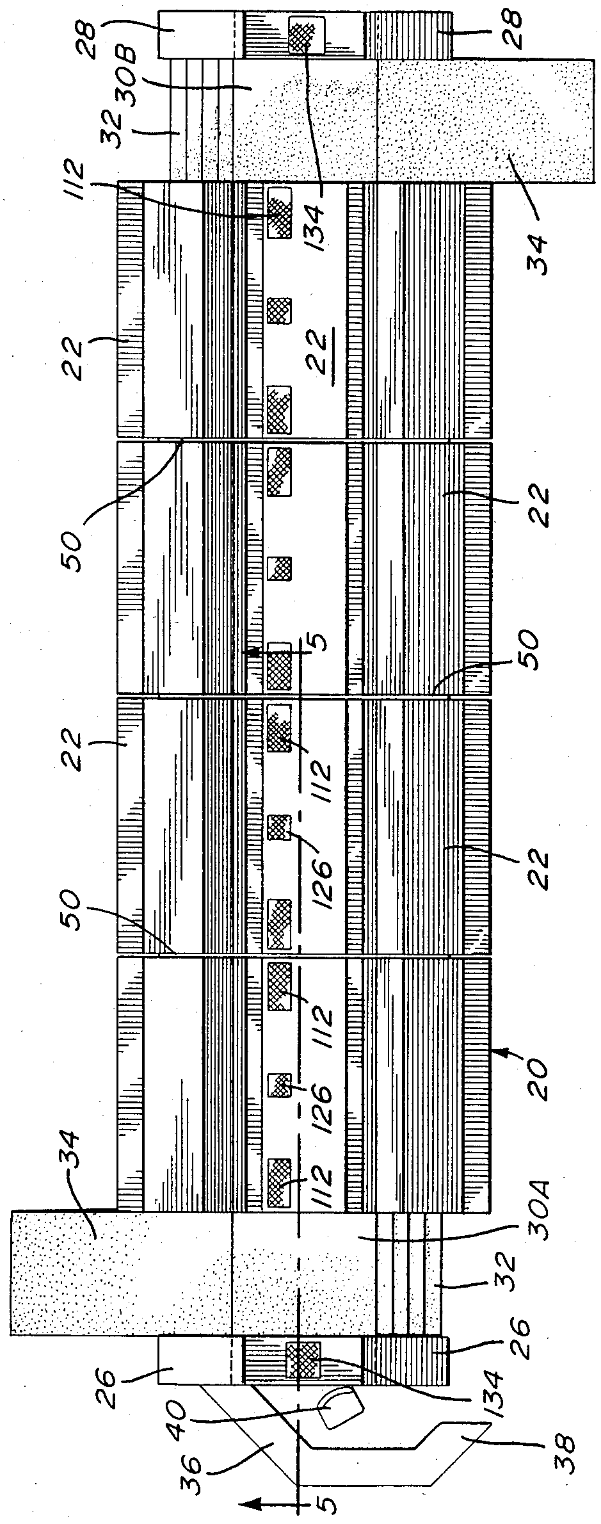
FIG. 4 is a top plan view of the tunnel.

We will first refer to FIGS. 1 to 4 of the drawings. The tunnel, denoted 20, is illustrated as comprising a plurality of distinct adjacent boxes 22 arranged concentrically and longitudinally co-axially to form the tunnel. The boxes 22 define an inner space or inner corridor 24, of such large dimensions as to accommodate a number of persons standing in a row therewithin.

The tunnel 20 also includes front and rear end doors 26, 28, respectively, which are illustrated as being of octogonal cross-section, and outwardly extendable therefrom over outwardly-extending portions of the tunnel ground-spaced bottom floor 30, at 30A, 30B, respectively. Access to and exit from floor portions 30A, 30B, respectively, is facilitated by stairs 32, and/or ramps 34 for physically-handicapped individuals, which stairs and ramps may also be arranged on alternate sides at both ends thereof (see FIGS. 1 and 2).

The tunnel 20 of the invention may also include a foremost information and control desk 36 frontwardly located at the front end door 26. The desk 36 is roughly cupshaped, with an inwardly-extending leg 38 short of door 26, for allowing entry therewithin by an officer in charge. The officer will sit on a seat 40.

The control explains why the entrance into the corridor 24 is preferably made at the entry near control desk 36, inwardly of front end door 26.

As shown in FIG. 6, each box 22 includes an inner translucent screen 42 forcing the inner wall, an outer wall 44 provided with an access door 44A, side walls 46 and end walls 48. Each box has a rectangular shape with a generally square cross-section, as shown in FIG. 6. Referring to FIGS. 1 and 6, it is seen that the boxes are disposed in end-to-end relationship to form longitudinal rows along the tunnel, and also transverse rows of, for instance, seven boxes which confer to the corridor 24 an octogonal cross-section in association with floor 30, which defines the eighth side of the octogon, as clearly shown in FIG. 6. The boxes 22 are supported by upstanding arch-shaped support frames 50, preferably of one-piece construction and definin9 seven mutually-inclined sections conforming to the orientation of the boxes in a transverse row. Frames 50 have bottom extensions 52 at both lower ends, which are removably pinned at 53 to upstanding brackets 54 fixed to a base plate 56, which extends the entire length of the tunnel 20 and is directly supported on the ground G by adjustable foot pads 58.

Figure 8:
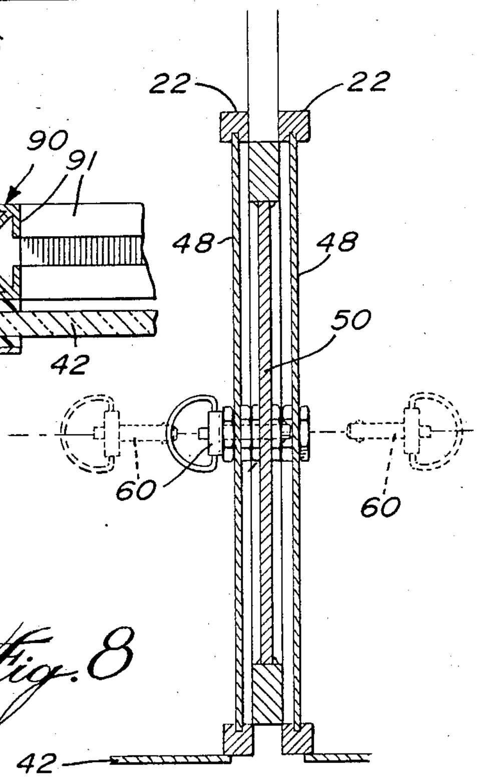
FIG. 8 is a cross-sectional view taken from line 8—8 of either of FIG. 2 or 6.

There is a supporting frame 50 disposed between each transverse row of boxes 22 and at both ends of the tunnel 20. FIGS. 6 and 8 show how the support frame 50 is sandwiched between the end walls 48 of two adjacent boxes 22, which are removably secured to opposite sides of frame 50 by quick locking pins 60, which are accessible through access door 44A.

Figure 5:
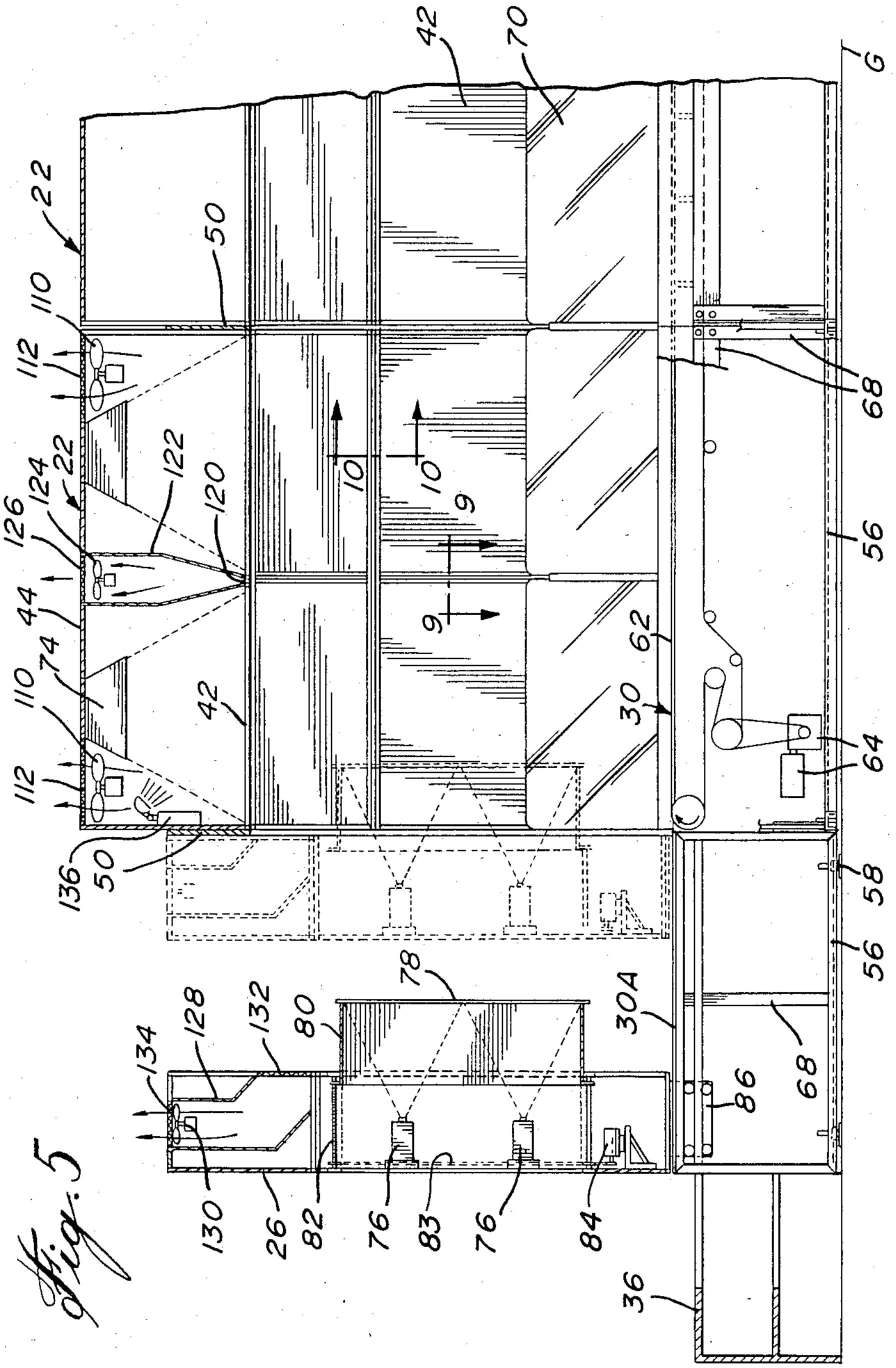
FIG. 5 is a longitudinal vertical sectional view, taken along line 5—5 of FIG. 4, of the tunnel front end portion, with the entrance thereof being shown opened in full lines and closed in dotted lines.

FIGS. 5 and 6 show that the floor 30 of the tunnel 20 consists of the top run of a belt conveyor 62 operated by a motor and speed reducing unit 64. The belt conveyor assembly 62 is supported by a framework 68 upstanding from base plate 56, as shown in FIGS. 5 and 6, with the top run of the belt conveyor at the level of front end floor 30A and rear end floor 30B. This level also substantially coincides with the lowermost portions of the inner translucent screens 42 of the lowermost longitudinal rows of boxes on each side of the belt conveyor 62.

Transparent guard rails 70 upstand from each side of the belt conveyor to protect against breakage of the projection screens 42 of the lowermost longitudinal rows of boxes 22. As shown in FIG. 6, each box 22 houses an image projection assembly including an image projector 72 and a reflecting mirror 74, which projects an image onto the translucent screens 42. Similarly, each door 26 and 28 may be provided with image-producing means, as shown in FIG. 5. Projectors 76 are mounted within the door and project an image on a transverse screen 78. This screen may be divided in, for instance, four sections, as suggested in FIGS. 2 and 7, each receiving the image of a projector 76. The entire screen assembly 78 is mounted at the end of a sleeve 80 which is arranged for telescopic movement within and out of the door, this movement being obtained through endless screws 82 actuated in rotation by an endless conveyor chain 83 powered by a bottom motor 84. Each door is slidable between opened and closed position, as shown in FIG. 5, being mounted on a guided roller system 86 carried by the framework of each floor section 30A and 30B.

Figure 7:
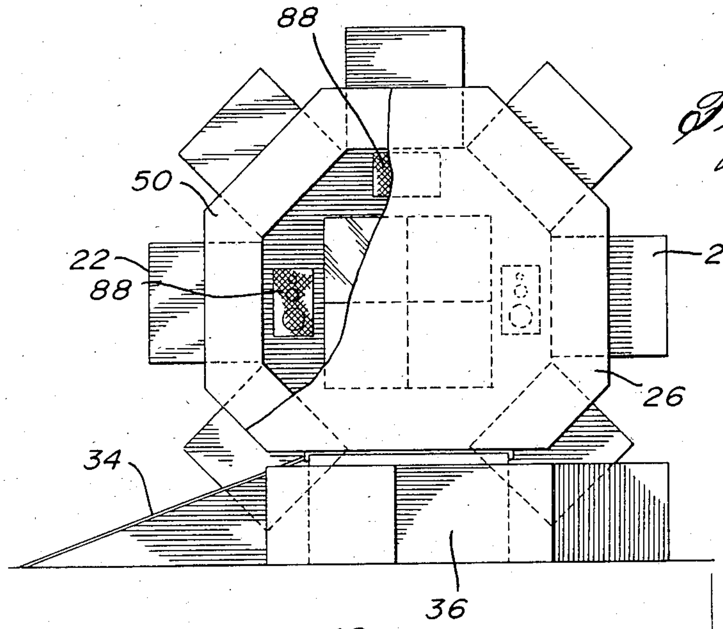
FIG. 7 is an elevation of the rear end face of the tunnel, the end door being partly taken away for clarity purposes.

Stereophonic sound may be provided within the tunnel through loudspeakers mounted on each side of screen 78 of the doors, as shown at 88 in FIG. 7.

Figure 9:
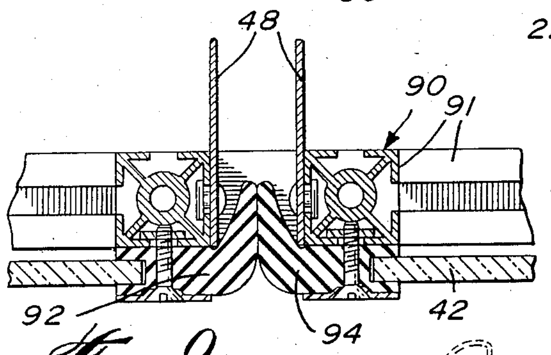
FIG. 9 is a cross-sectional view of the adjacent portions of two coplanar projection screens within the tunnel and taken along line 9—9 of FIG. 5.

FIG. 9 shows how the framework for each box 22 is constituted of standard, extruded aluminum frame members 90 providing arrow-shape radial stems 91 which are used to secure the end panels to the framework and which are also used to mount the translucent screens 42 in a shock-proof rubber strip 92 which defines an outwardly-projecting lip 94 contacting the lip of an adjacent box of the same longitudinal row, thereby defining a light-tight joint between the two adjacent boxes, with a minimum of dark space at the junction of the two boxes.

A similar arrangement is shown in FIG. 10, namely: rubber strips 92 with contacting lips 94 at the junction of two boxes in the same transverse row. If it is desired to have a still narrower dark junction between the projection screens 42 of these two boxes, the embodiment shown in FIG. 11 is used, whereby the inner screens 42 of two adjacent boxes of a given transverse row of such boxes are maintained together by a connector 96 secured to the end of a T-shape bracket 98, the transverse legs of which are secured in turn to the frame members 90 of the two adjacent boxes. The projection boxes 22 must be ventilated. To this end, referring to FIGS. 5 and 6, each transverse row of boxes 22 is provided with a lower duct 100 providing an air inlet 102 at ground level, with duct 100 mounting electric fan 104, which circulates the air through the several boxes of a transverse row in series for each half-part of the tunnel, the air circulating, in accordance with arrows 106, through side wall openings of each box, with said side wall openings in communication with removable conduits 108 between each box. The air is evacuated through a top fan 110 (see FIG. 5) through the outlet 112 made in the outer wall 44 of the top longitudinal row of boxes, as shown in FIG. 4.

A suitable ventilator system for the projectors 76 in the two doors 26,28, not shown, is also provided. Since these doors can take a closed position with people inside the tunnel, it is important that suitable ventilation of the tunnel be provided. For this purpose, each transverse row of boxes 22 is provided with a bottom air inlet duct 116 (see the right-hand side of FIG. 6), this duct having an air fan 118 for circulating air through the tunnel. This air is exhausted through the roof of the tunnel (see FIG. 5) through narrow slits 120 communicating with a funnel-shape air duct 122 at the junction of two boxes of a longitudinal row, duct 122 being provided with air fan 124 which evacuates the air through air outlet 126 at the top of the tunnel, as shown in FIG. 4. Similarly, the top portion of each door 26, 28 is provided with an air exhausting duct 128 having a fan 130 with an air inlet 132 communicating with the inside of the tunnel, and an air outlet 134 at the top of the door, as shown in FIG. 5.

FIG. 5 shows also that an emergency light 136 can be mounted in one of the boxes 22. The audio-visual tunnel of the invention can be operated in two ways, either with the doors 26 and 28 in opened position with the conveyor belt 62 in operation, so that the visitors will move through the tunnel by being nearly completely surrounded by images projected through screens 42 and also in a sound environment. The other way, with the conveyor belt 62 stopped, a certain number of persons can enter the tunnel; then the doors 26, 28 are closed and the door projector screens 78 extended within the tunnel, if necessary, so that the audio-visual environment will be still more complete. This tunnel is designed to be quickly assembled and disassembled and to be easily transportable from one location to another. That is why all the boxes are removably connected to the support frames 50 and the latter easily disconnectable from the base plate 56 which supports the conveyor belt arrangement. Also, as shown in FIG. 6, the electric power required for the projectors 72 in each box 22, is supplied by quick disconnector electric wires 138 which might run through the connector ducts 108.

What I claim is:

1. An apparatus for entertaining a number of persons, comprising an elongated tunnel including an endless conveyor constituting the floor of the tunnel, a plate supporting said conveyor, a number of spaced-parallel arch-shaped frames upstanding from said base plate and tunnel floor transversely to said conveyor, a number of image projecting boxes removaly supported by said arch-shaped frames each having an inner wall constituting a projection screen, the projection screens of the several boxes defining the inner wall of said tunnel, and means in said boxes producing images on said screens that are visible from within said tunnel, said conveyor capable of transporting said persons from one end to the other of said tunnel.

2. The apparatus as defined in claim 1, further including first and second doors at opposite ends of said tunnel movable between an opened position to gain access to the tunnel, and a closed position to bring darkness in the tunnel.

3. The apparatus as defined in claim 2, wherein each door is further provided with image-projecting screens facing the inside of the tunnel and means within said doors to produce images on said last-named screens.

4. The apparatus as defined in claim 3, wherein the image projecting screens of each door is mounted for telescopic movement with respect to said door.

5. The apparatus as defined in claim 1, wherein said tunnel is of modular construction, said boxes being of similar size and s said boxes being arranged in a series of longitudinal and transverse rows extending longitudinally and transversely of said tunnel respectively, said are-shaped frames upwardly extending between adjacent transverse rows of said boxes and removably connected to the end walls of said boxes, said arch-shaped frames being removably connected to said base plate.

6. The apparatus as defined in claim 5, wherein the projection screen of each box is flat and arranged to form a portion of the inner wall surface of said tunnel, said tunnel having an octogonal cross-sectional shape, there being seven boxes in a transverse row, with their screens forming seven of the sides of said octogonal shape and the floor of said tunnel forming the eighth side of said octogonal shape.

7. The apparatus as defined in claim 6, wherein each box has a framework and walls held by said framework, each projection screen mounted on said framework through shock-absorbing elastomeric strips all around said projection screen, said strips having a protruding lip forming a light-proof joint with the lip of an adjacent box of the same transverse row and with the lip of an adjacent box of the same longitudinal row.

8. The apparatus as defined in claim 6, wherein each box has a framework, T-shaped brackets interconnecting the frameworks of two adjacent boxes of a transverse row of said boxes, said brackets radially extending towards the center of said tunnel and connector means carried by said brackets and coupling and holding the projection screens of said two adjacent boxes of said transverse row to provide a dark junction of a minimum width between said two screens.

9. The apparatus as defined in claim 1, further including ventilation means for the tunnel and air-circulating means through the inside of said boxes for cooling the image-producing means.

10. A modular entertainment tunnel consisting of a ground-anchor member, an upright casing projecting from said anchor member and defining a top flat wall and two opposite side walls, a large arched-shaped frame member mounted at both ends thereof to said ground anchor member outwardly of each of said casing side walls, and at least three closed box units fixedly removably secured to said frame member in concentric fashion, each box unit comprising a translucent flat inner wall, each pair of adjacent box units being interconnected at the opposite transverse edges of their translucent walls; each said box unit including therein an independent picture generating means impressing said inner translucent wall; whereby an individual standing on the floor constituted by said casing top wall will see a substantially panoramic scenery made of the successive pictures appearing on the picture-producing screens constituted by said box units translucent walls.

11. A tunnel as defined in claim 10, further including two retractable light-proof doors at the ends of said tunnel, said box units interconnected by light-proof edge connectors.

12. A tunnel as defined in claim 11, wherein each of said doors defines an inner translucent wall, and includes an independent picture-generating means therein impressing the latter translucent wall to complete the breath of the panoramic scenery, and sound-generating means.

13. A tunnel as defined in claim 10, wherein the bottom edges of the two lowermost box units horizontally register with said casing top wall.

* * * * *